United States Patent [19]
Amro et al.

[11] Patent Number: 6,041,326
[45] Date of Patent: Mar. 21, 2000

[54] METHOD AND SYSTEM IN A COMPUTER NETWORK FOR AN INTELLIGENT SEARCH ENGINE

[75] Inventors: Hatim Yousef Amro, Austin; John Paul Dodson, Pflugerville, both of Tex.

[73] Assignee: International Business Machines Corporation, Armonk, N.Y.

[21] Appl. No.: 08/971,018

[22] Filed: Nov. 14, 1997

[51] Int. Cl.[7] .................................................. G06F 17/00
[52] U.S. Cl. ................................. 707/10; 707/9; 707/104
[58] Field of Search ........................... 707/2, 5, 10, 104, 707/9

[56] References Cited

U.S. PATENT DOCUMENTS

| | | | |
|---|---|---|---|
| 5,113,341 | 5/1992 | Kozol et al. | 364/419 |
| 5,323,316 | 6/1994 | Kadashevich et al. | 364/419.01 |
| 5,414,838 | 5/1995 | Kolton et al. | 707/104 |
| 5,428,529 | 6/1995 | Hartrick et al. | 364/419.1 |
| 5,444,823 | 8/1995 | Nguyen | 395/51 |
| 5,504,891 | 4/1996 | Motoyama et al. | 395/600 |
| 5,530,852 | 6/1996 | Meske, Jr. et al. | 395/600 |
| 5,544,320 | 8/1996 | Konrad | 395/200.09 |
| 5,548,508 | 8/1996 | Nagami | 364/419.02 |
| 5,557,722 | 9/1996 | DeRose et al. | 395/148 |
| 5,583,762 | 12/1996 | Shafer | 395/694 |
| 5,587,902 | 12/1996 | Kugimiya | 395/752 |
| 5,619,648 | 4/1997 | Canale et al. | 395/200.01 |
| 5,659,732 | 8/1997 | Kirsch | 707/5 |
| 5,694,593 | 12/1997 | Baclawski | 707/5 |
| 5,734,893 | 3/1998 | Li et al. | 707/104 |
| 5,761,499 | 6/1998 | Sonderegger | 707/10 |
| 5,778,357 | 7/1998 | Kolton et al. | 707/2 |
| 5,802,518 | 9/1998 | Karaev et al. | 707/9 |
| 5,819,271 | 10/1998 | Mahoney et al. | 707/9 |
| 5,864,871 | 1/1999 | Kitain et al. | 707/104 |

OTHER PUBLICATIONS

Sharma et al., "Hypertext based distributed object management for information location and retrieval", IEEE, pp. 102–107, Dec. 1993.

Baclawski et al., "KEYNET: Fast indexing for sematically rich information retrieval", Northeastern University, College of Computer science, Boston, Massachusetts 02115, pp. 1–18, Dec. 7, 1993.

Baclawski et al., "High–Performance, Distributed Information Retrieval", Northeastern University, College of Computer science, Boston, Massachusetts 02115, pp. 1–3, Mar. 23, 1994.

Mic Bowman et al., "Harvest: A Scalable, Customizable Discovery and Access System", Department of Computer Science, University of Colorado, pp. 1–28, Aug. 1994.

Banet, "Searching far and wide: the powerful document retrieval software of PLS", Seybold Publications Inc., v10 n8 p17 (6), Apr. 22, 1996.

Primary Examiner—Wayne Amsbury
Assistant Examiner—Thuy Pardo
Attorney, Agent, or Firm—Richard A. Henkler; Andrew J. Dillon

[57] ABSTRACT

A method and system in a remote computer network for allowing users to customize on-line search engines for on-line data searches. An on-line search engine is provided at a remote network site, such that the on-line search engine may be displayed at local network sites linked to the computer network. An independent user-defined search plug-in program is then designated for limiting the scope of online data searches to particular data subjects, such that the user-defined search plug-in program is called for processing by the on-line search engine during on-line data searches by the on-line search engine at a local network site utilizing search terms. The independent user-defined search plug-in program is subsequently stored at the local network site. Finally, the independent user-defined search plug-in program is automatically linked with the search terms, such that all searches performed by the on-line search engine at the local network site operate according to parameters determined by the user-defined search plug-in program and the search terms.

12 Claims, 7 Drawing Sheets

METHOD AND SYSTEM IN A COMPUTER NETWORK FOR AN INTELLIGENT SEARCH ENGINE

BACKGROUND OF THE INVENTION

1. Technical Field

The present invention relates to improved information-retrieval methods and systems. In particular, the present invention relates to improved information-retrieval methods and systems utilized in association with graphical user interfaces. More particularly, the present invention relates to Internet-based information-retrieval methods and systems. Still more particularly, the present invention relates to Internet-based search engines.

2. Description of the Related Art

The development of computerized information resources, such as remote networks, allow users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

One type of remote network commonly utilized in recent years is the Internet. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "web pages" constructed from a Hypertext Markup Language (HTML), or other server-generated data. Each web page can also be referred to simply as a "page."

The client and server typically display browsers and other remote network data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

The evolution of personal computers over the last decade has accelerated the web and Internet toward useful everyday applications. Nearly every computer sold over the last several years has or will, at some point, become "on-line" to an Internet service provider. Somewhere between 20 and 30 million people around the globe use some form of Internet service on a regular basis. The graphical portion of the World Wide Web itself is usually stocked with more than twenty-two million "pages" of content, with over one million new pages added every month.

Free or relatively inexpensive computer software applications such as Internet "search engines" make it simple to track down sites where an individual can obtain information on a topic of interest. A person may type in a subject or key word and generate a list of network sites (i.e., web sites). Thus, with "home pages" published by thousands of companies, universities, government agencies, museums, and municipalities, the Internet can be an invaluable resource. With a little practice, even new users can skim millions of web pages or thousands of newsgroups, not only for topics of general interest, but also to access precise bits of data. The market for Internet access and related applications is explosive and is growing faster than expected, doubling in size approximately every three months.

A problem associated with these type of Internet "search engines" is simply dealing with the vast amount of potential data that may be searched and retrieved. By entering certain keywords into such search engines, unwanted data, in addition to the desired data, may be discovered by the search engine, forcing the user to wade through often useless and unwanted search results in order to get to the desired data. From the foregoing it can be appreciated that a need exists for tailoring search engines to the needs of a particular user. By tailoring a search engine to the desires of a particular user, a user can essentially utilize the search engine to filter unwanted data and thus avoid certain sites or areas altogether.

SUMMARY OF THE INVENTION

It is therefore an object of the invention to provide an improved information-retrieval method and system.

It is another object of the present invention to provide improved information-retrieval methods and systems utilized in association with graphical user interfaces.

It is yet another object of the present invention to provide improved Internet-based information-retrieval methods and systems.

It is still another object of the present invention to provide an improved Internet-based search engine.

The above and other objects are achieved as is now described. A method and system in a remote computer network are disclosed for allowing users to customize on-line search engines for on-line data searches. An on-line search engine is provided at a remote network site, such that the on-line search engine may be displayed at local network sites linked to the computer network. An independent user-defined search algorithm is then designated for limiting the scope of on-line data searches to particular data subjects, such that the user-defined search algorithm is called for processing by the on-line search engine during on-line data searches by the on-line search engine at a local network site utilizing search terms. The independent user-defined search algorithm is subsequently stored at the local network site. Finally, the independent user-defined search algorithm is automatically linked with the search terms, such that all searches performed by the on-line search engine at the local network site operate according to parameters determined by the user-defined search algorithm and the search terms.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
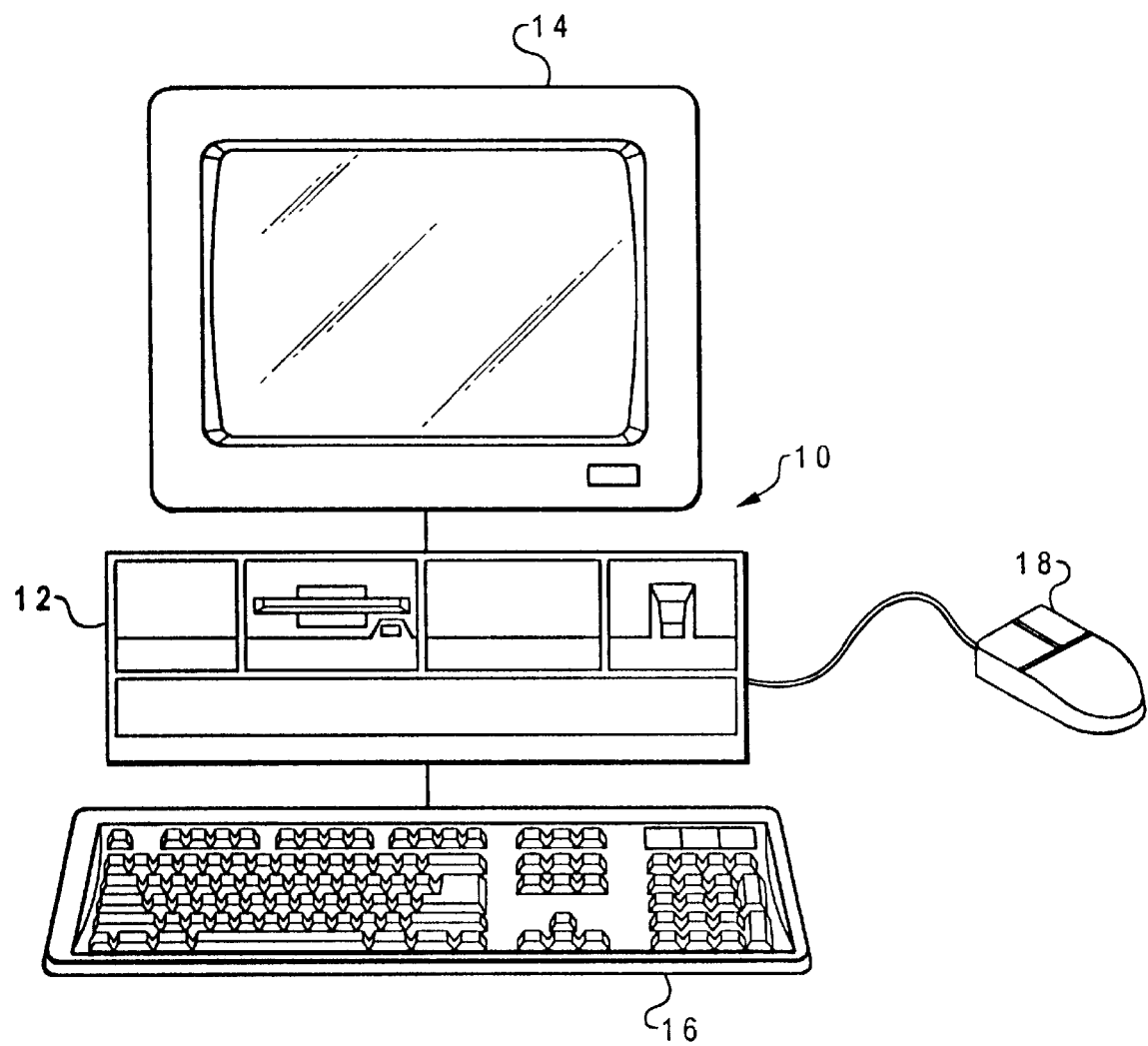
FIG. 1 is a pictorial representation of a data-processing system which can be utilized to implement the method and system of the present invention.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer, such as the IBM RISC/6000 computer, a product of International Business Machines Corporation, located in Armonk, N.Y. "RISC SYSTEM/6000" is a trademark of International Business Machines Corporation, and also can be referred to as the "RS/6000."

Figure 2:
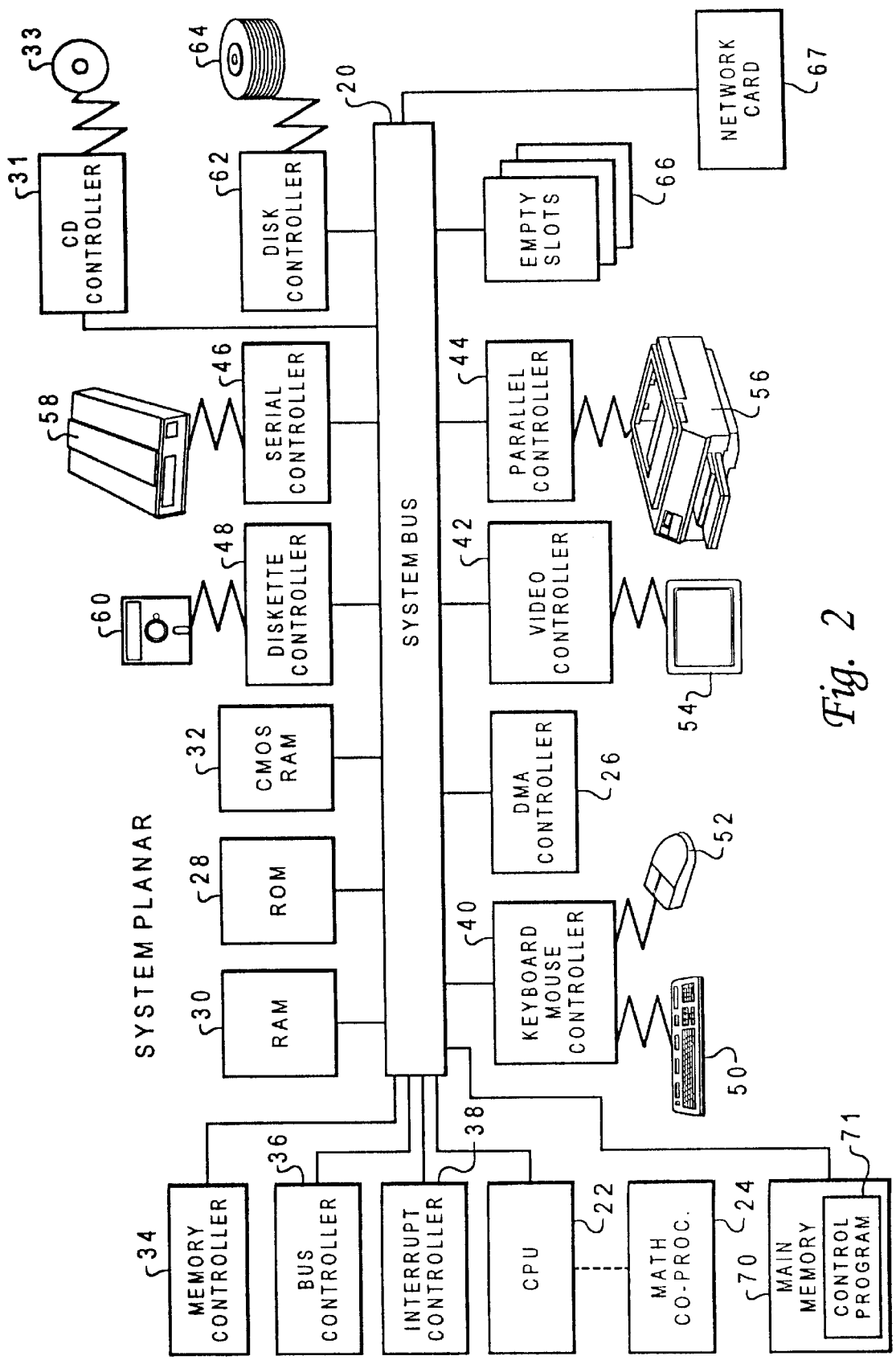
FIG. 2 depicts a block diagram illustrative of selected components in a personal computer system which can be utilized to implement the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20, and includes a control program 71. Control program 71 resides within main memory 70 and contains instructions that when executed on CPU 22 carry out the operations depicted in the logic flowchart of FIG. 7 described herein. The computer program product also can be referred to as a program product. Control program 71 can support a number of Internet-access tools including, for example, an HTTP-compliant web "browser." Known browser software applications include: Netscape Navigator® ("Netscape"), Mosaic, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill. The present invention is designed to operate with any of these known or developing web browsers, in order to provide network navigation aids for web pages displayed with three-dimensional graphics.

Control program 71 also can support other remote network services, such as the file-transfer protocol (FTP) service, which facilitates the transfer and sharing of files across remote networks such as the Internet. Control program 71 can further support remote network services, such as remote terminal access (Telnet), which allows users to log onto computers coupled to the network. In addition, control program 71 additionally can support services, such as simple mail-transfer protocol (SMTP) or e-mail, and network news-transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy discs, hard-disk drives, audio CDs and CD ROMs, and transmission-type media, such as digital and analog communication links.

FIG. 2 additionally depicts a CD controller 31 for controlling a CD system 33. CD system 33 may run audio CDs or CD-ROMs, both well known in the art of digital electronic media. CD system 33 is a sound or data reproduction system that utilizes light to detect audio and data signals produced by digital recording on a CD. CD system 33 differs from other data or sound reproduction systems in that there is no physical contact between the pick-up and the recording or recorded data, which minimizes wear. An information layer is buried below the surface of the audio CD or CD-ROM, which minimizes errors in sound or data reproduction due to dust or other marks on the surface. CD system 33 can operate both audio CDs and CD-ROMs. The term CD-ROM is an acronym for "compact disc read-only memory." A CD-ROM is a form of CD storage characterized by high capacity (e.g., 600 megabytes) and the use of laser optics rather than magnetic means for reading data.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture or to groups of computers and associated devices which are connected by communications facilities. Those skilled in the art will appreciate that the hardware depicted in FIG. 2 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
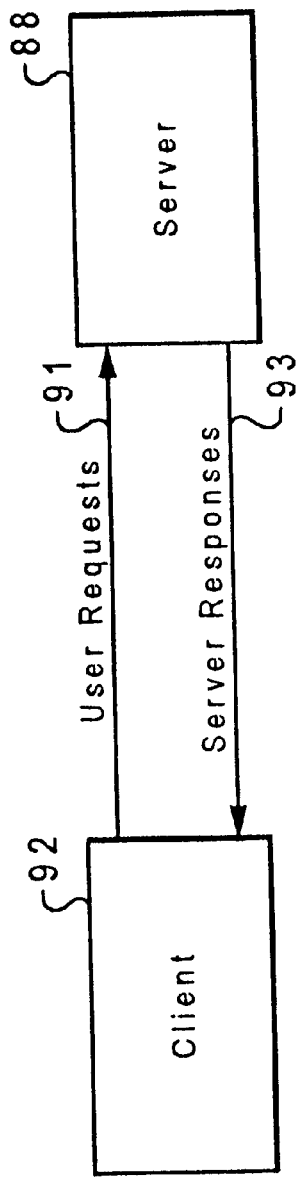
FIG. 3 illustrates a block diagram illustrative of a client/server architecture which can be utilized to implement the method and system of the present invention.
Figure 4:
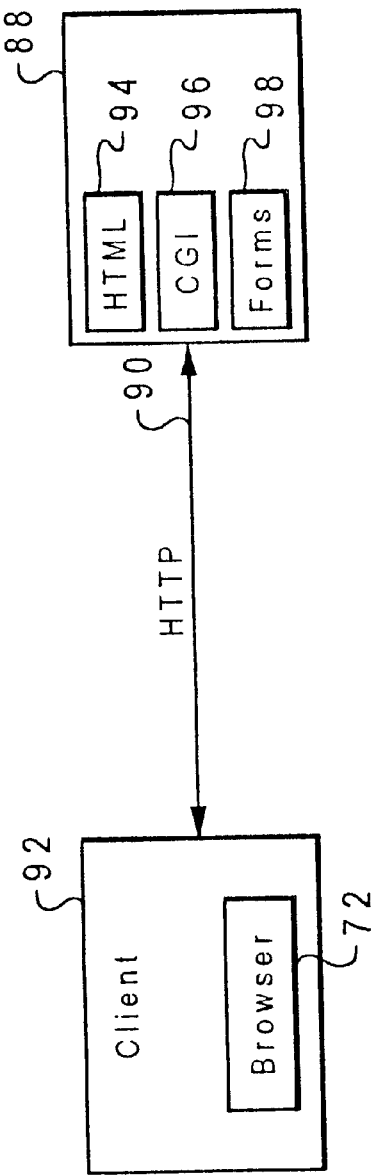
FIG. 4 depicts a detailed block diagram illustrative of a client/server architecture which can be utilized to implement the method and system of the present invention.
Figure 5:
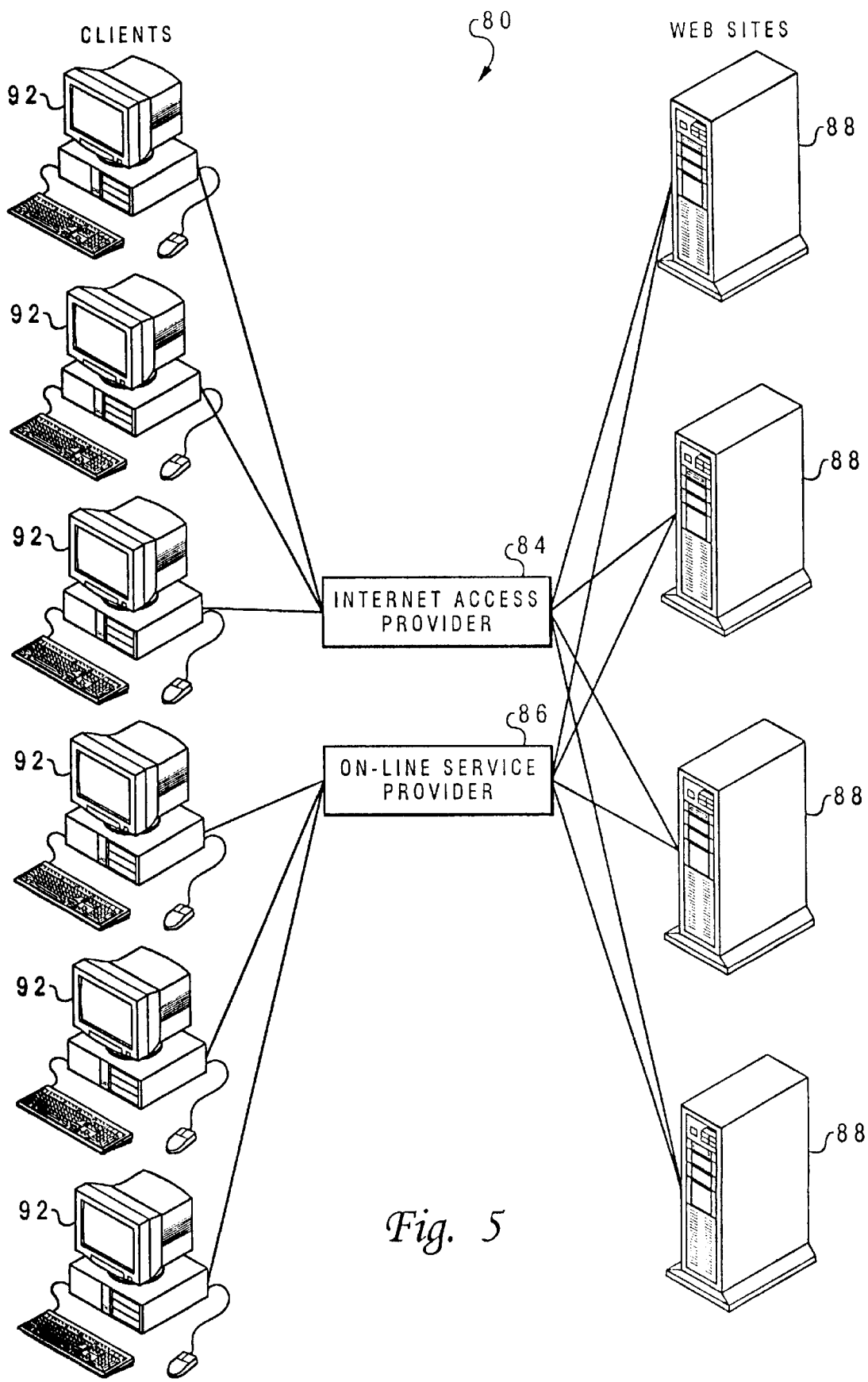
FIG. 5 is a diagram illustrative of a computer network which can be implemented in accordance with the method and system of the present invention.

In FIG. 3, FIG. 4, and FIG. 5, like parts are indicated by like numbers. FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, or the Lynx-brand browsers or others which are available and provide the functionality specified under HTTP can be utilized with the present invention.

Server 88 executes the corresponding server software which presents information to the client in the form of HTTP responses 90. The HTTP responses 90 correspond with web "pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion. Common Gateway Interlace (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user via a client application program to specify terms in which the server causes an application program to function (e.g., terms or keywords contained in the types of stories/articles which are of interest to the user).

FIG. 5 is a diagram illustrative of a computer network 80 which can be implemented in accordance with the method and system of the present invention. Computer network 80 is representative of a remote network, specifically the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a browser, a known software tool utilized to access servers 88 via the access providers 84. Each server 88 operates a web site which supports files in the form of documents and pages. A network path to servers 88 is identified by a Universal Resource Locator having a known syntax for defining a network collection.

Figure 6:
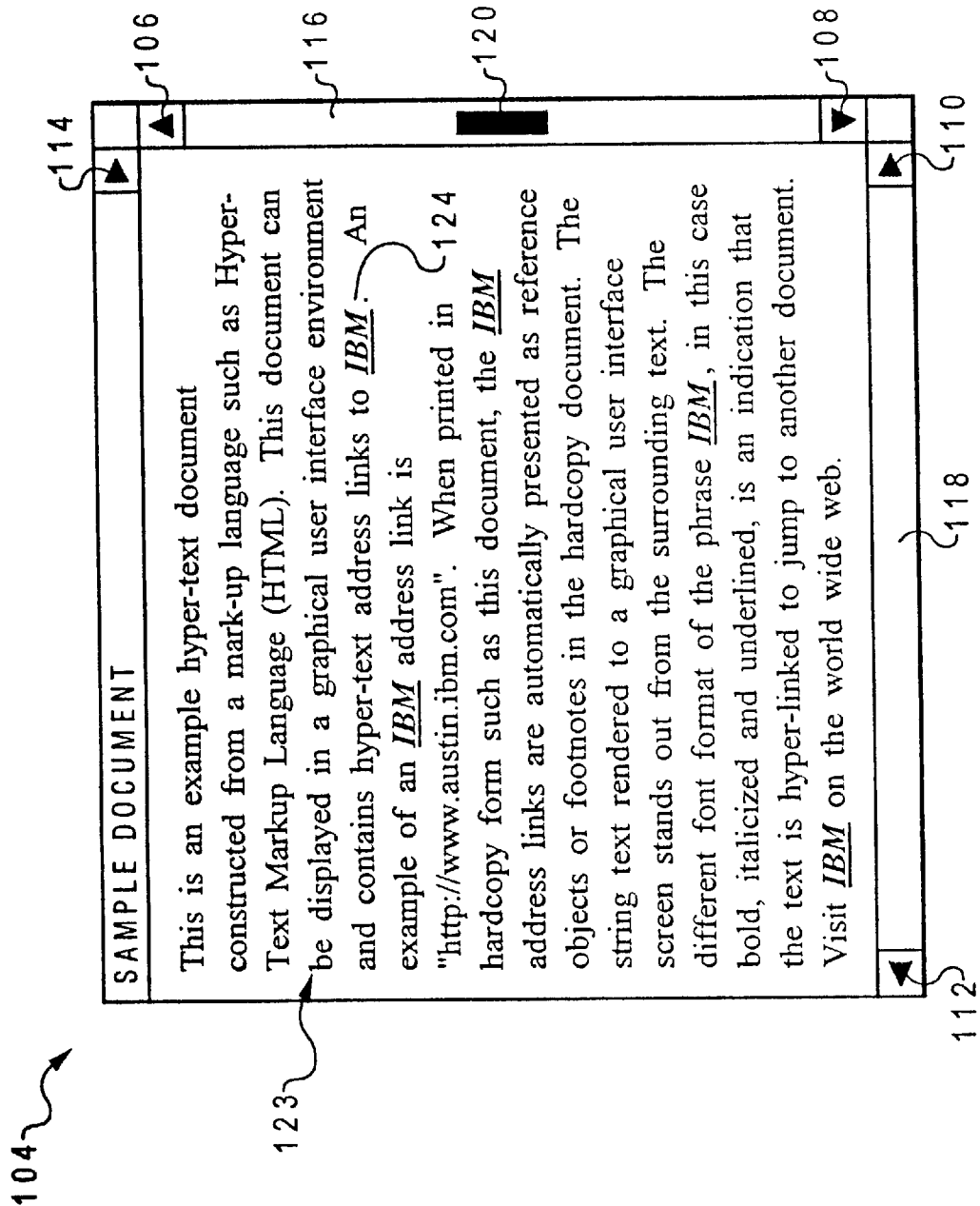
FIG. 6 illustrates a hypertext document contained within a graphical user interface window which can be utilized to implement the method and system of the present invention.

FIG. 6 illustrates an example hypertext document 123 contained within a graphical user interface window 104 which can be utilized in accordance with the method and system of the present invention. Window 104 displays a portion of a hypertext document 123 constructed from a mark-up language, such as Hypertext Mark-up Language (HTML). The size and position of elevator 120 within scroll bar 116 corresponds to the size and position of the current viewable page in relation to hypertext document 123. Hypertext document 123 can be accessed from a data-processing system contained within a remote network, such as the Internet.

In the example of FIG. 6, in view of the fact that hypertext document 123 includes too many pages to view simultaneously, the user can position a mouse cursor over up-arrow section 106 or down-arrow section 108 of scroll bar 116 and click a pointing device (e.g., a mouse) to scroll hypertext document 123 upward or downward, as appropriate. A vertical scroll bar 118 includes arrow section 112 and arrow section 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user "clicks" on string text 124 with a mouse or other pointing device, the graphical user interface shifts the presently viewed hypertext document 123 to another hyper-linked document.

So-called "search engines" may be displayed within a browser application in a graphical user interface window such as window 104. Depending upon the type of search engine utilized, hypertext links such as the aforementioned hypertext links may or may not be displayed within the search engine. A search engine, on the Internet, is essentially a program that searches for keywords in files and documents found on the World Wide Web or other such computer networks. Such search engines typically can search, in addition to documents found on the World Wide Web, files and documents found within newsgroups, Gopher menus, and FTP archives. Some search engines may be utilized exclusively for a particular Web site, while other search engines may search across many sites, using agents to gather lists of available files and documents and store lists of such files and documents in databases that users can search by keyword. Most search engines reside on a server at a remote network site.

Figure 7:
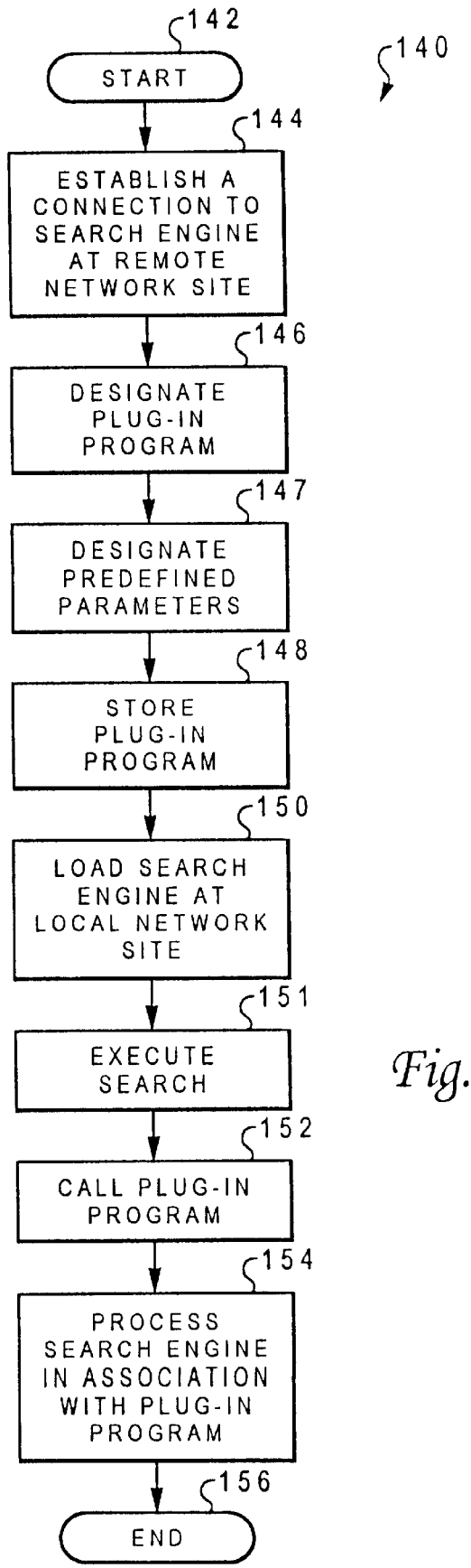
FIG. 7 depicts a flowchart of operations illustrative of a method for allowing users to customize on-line search engines for on-line data searches, in accordance with a preferred embodiment of the present invention.

FIG. 7 depicts a flowchart of operations 140 illustrative of a method for allowing users to customize on-line search engines for on-line data searches, in accordance with a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer 10 of FIG. 1 and FIG. 2, in processing electrical or other (e.g. mechanical, chemical) physical signals to generate other desired physical signals.

Thus, as depicted at 142, the process according to a preferred embodiment of the present invention is initiated. As illustrated at block 144 an on-line search engine is provided at a remote network site (i.e., a server) such that the on-line search engine may be displayed at local network sites (i.e., clients) in a client/server network as described herein. As depicted at block 144, a connection is established to the on-line search engine provided at the remote network site. Although a client/server network may be implemented in accordance with a preferred embodiment of the present invention, those skilled in the art will appreciate that other computer networks may also be utilized in accordance with a preferred embodiment of the present invention.

As described at block 146, a plug-in program is designated for limiting the scope of on-line data searches to particular searches or to certain conditions (e.g., time conditions) such that the plug-in program may be called for processing by the on-line search engine during on-line data searches by the on-line search engine. A calling sequence is utilized to manage the link between the plug-in program and the search engine application. When a plug-in program call occurs, the calling sequence acts as an agreement between the calling routine (i.e., the search engine) and the called plug-in program on how arguments will be passed and in what order, how values will be returned, and which routine will handle any necessary housekeeping (e.g., cleaning up the stack). As depicted at block 147, predefined parameters to be processed by the plug-in program are designated. Those skilled in the art will appreciate that the operation described at block 147 may be utilized in accordance with a Graphical User Interface for allowing the user to specify search criteria and customization parameters. Those skilled in the art will also appreciate that such a Graphical User Interface can also present a selection/customization mechanism for the plug-in program. While it is possible to completely embody the customization of the search within the plug-in program, those skilled in the art will appreciate that such an implementation would not be very usable, since altering the search criteria would necessitate recompiling the plug-in program. Thus, a Graphical User Interface utilized in association with the plug-in program would be appropriate to handle a customization/selection mechanism.

As illustrated at block 148, the plug-in program is stored at the local network site within a directory of the browser application utilized in accordance with a preferred embodiment of the present invention. As depicted at block 150, in response to user input (e.g., clicking a hypertext link to the search engine site), the search engine is displayed within a browser window at the local network site. As depicted at block 151, an actual search is then implemented utilizing the search engine. As illustrated at block 152, the plug-in program is then called for utilization by the search engine in performing a data search of the World Wide Web, newsgroups, FTP, and so forth.

As described at block 154, a search is then performed via the search engine in association with the plug-in program and any parameters, user-defined or otherwise, as determined by the plug-in program. Finally, the process ends, as depicted at block 156. The type of plug-in program utilized herein depends upon the desires of a user. The user determines how many predefined traits are to be utilized during a search. For example, a user may be knowledgeable about a certain topic, and may want to avoid certain sites or areas altogether. Depending upon the type of plug-in program designated by the user, the search engine calls this plug-in program to perform the search, avoiding sites or areas in response to instructions processed by the plug-in program.

A user-defined plug-in program thus functions between the actual search engine utilized by the user and the user. Search results from the search engine can be filtered through such user-defined plug-in programs. The filtered search results are then displayed for the user as the actual search results. Traditional search engines require the user to statically specify the search criteria in advance of performing the actual search. In a preferred embodiment of the present invention, however, dynamic search criteria are provided. The search provides an intelligent program that performs dynamic search decisions based on data presented to it during the search.

For example, consider the case where a very specialized university professor is interested in searching for information about a specific breed of plant life. The university professor is aware that this particular breed of plant life exists in very few parts of the world. If the plant life has a common name that results in a large number of hits resulting from a particular search via a search engine, a program that "plugs" into the search engine applies a series of tests and determinations to the resulting data stream of search engine "hits." Such algorithms are referred to in the art as "plug-in" programs or also as "plug-ins." The plug-in program determines if a given "hit" is linked to the few parts of the "world" in which the university professor knows that these particular types of plant life exist. Aside from the addition of an "AND" condition associated with the remote network location resulting from the data search by the search engine, the URL (Universal Resource Locator) associated with the resulting "hit" is checked by the plug-in program to exclude certain groups that are determined not to be useful to the professor.

It is reasonable to expect that in the course of performing serious research, a database of locations to avoid may be collected. A simple comparison between a "hit" and this database may be programmed to weed out undesirable "hits." Also, the converse may also be programmed. More desirable network sites or types of networked sites may be ranked higher in a "hit" list produced than sites that are not as desirable to the university professor. For example, when searching for specific plant life indigenous to Zaire, sites actually residing the closest to Zaire can be ranked higher than sites located in Australia, for example.

Such a plug-in program may also be utilized to impose any semantic check on the resulting "hits." In other words, a series of conditional logic can be applied to each hit. An example in which a user-extended algorithm or "plug-in" program can define an acceptable hit is the case where the university professor desires that the hit must have been published within a particular time frame, AND cannot contain certain words, OR if certain words are identified, the words must have been published during a different time frame. Those skilled in the art will appreciate that the phrases "AND" and "OR" as utilized herein are simply examples of conditional logic that may be utilized in accordance with a preferred embodiment of the present invention.

Figure 8:
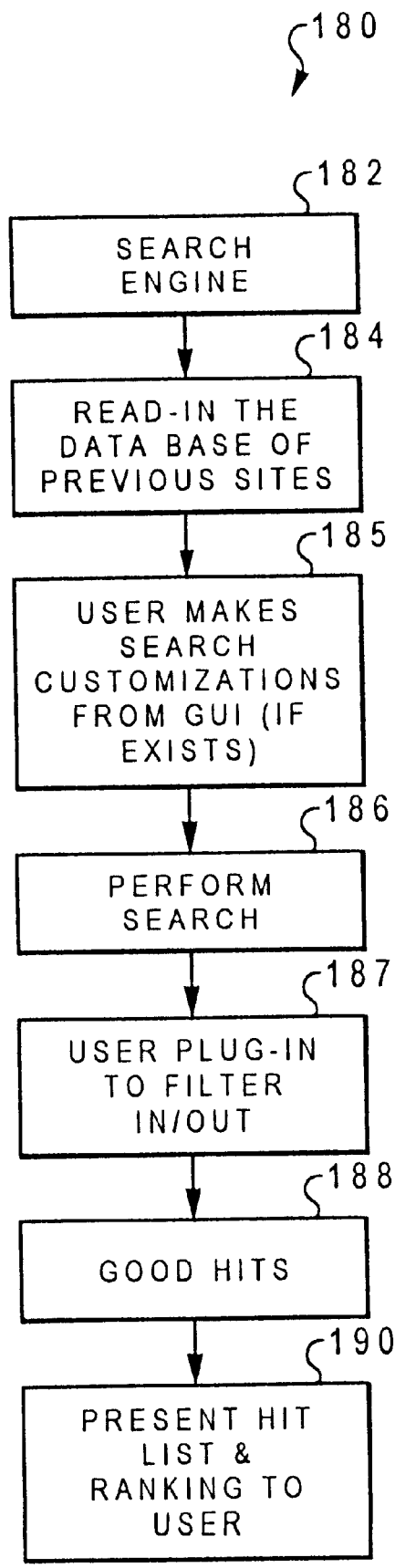
FIG. 8 depicts a structural diagram of a plug-in concept, in accordance with a preferred embodiment of the present invention.

The foregoing plug-in concept is illustrated by FIG. 8. FIG. 8 depicts a structural diagram 180 of a plug-in concept, in accordance with a preferred embodiment of the present invention. As respectively depicted at block 182 and block 184, a search engine is presented via a Graphical User Interface at a local network site, and a data base of previous sites encountered is "read-in," such that the information presented in the data base can be utilized by the search engine and the plug-in program. As illustrated at block 185, the user performs search customizations (i.e., setting parameters) via a Graphical User Interface, assuming such a Graphical User Interface is utilized in association with the search engine. As depicted at block 186, a search is then performed and as depicted at block 187, the user "plug-in" program acts as a filter by comparing the search engine "hits" with the database of known (i.e., previous) hits. Undesirable hits are thus weeded out in this manner, and the desirable hits (i.e., "good" hits) are presented, as illustrated at block 188. Finally, as illustrated at block 190, a "hit" list and ranking of such hits is presented to the user.

An alternative preferred embodiment of the present invention involves altering the manner in which the actual search engine actually operates to include the ability to receive directions and instructions directly from the user-defined plug-in program. Instead of merely acting as a filter as described herein, the user-defined plug-in program can function to direct the flow of the search engine while it is searching. Such an implementation requires exposure of API's into the search engine so that a plug-in programmer can control various aspects of the search. This allows the search engine to be controlled programmatically by the plug-in program. Those skilled in the art will appreciate that an API (Application Program Interface) is a set of routines utilized by an application program to direct the performance of procedures by the computer's operation system.

Whichever method is utilized to implement a preferred embodiment of the present invention, a special "GUI-Builder" may be written that allows for the creation of GUI controls, such as buttons, checkboxes, radio buttons, sliders, text entry fields and the like. Such a GUI-Builder is utilized in accordance with a preferred embodiment of the present invention to associate specific plug-in behavior with control. For example, a series of check boxes may be associated with various user-defined search criteria. In accordance with the example of the university professor described above, a series of checkboxes map to certain specific locations in the "world" in which to search, such that a slider GUI control is created that maps to date ranges, time frames, and so forth. Such controls set the state of settings within the user-defined plug-in and essentially "controls" the actual search.

While the invention has been particularly shown as described with reference to a preferred embodiment, it will be understood by those skilled in the art that various changes in form and detail may be made therein without departing from the spirit and scope of the invention. Utilization of the Internet in association with the method and system described herein is not a necessary feature of the present invention. For example, the present invention is applicable to other communication networks besides the Internet, including so-called "intranets" (i.e., networks that are internal to particular organizations). The Internet, as described herein, is merely one example of a remote network that can be utilized in accordance with a preferred embodiment of the present invention. It is therefore contemplated that such modifications can be made without departing from the spirit or scope of the present invention as defined in the appended claims.

What is claimed is:

1. A method for enhanced on-line search processing in a distributed computer network which includes at least one on-line search engine at a network site remote from a local network site, said method comprising the steps of:

designating an independent user-defined plug-in program to be stored at said local network site for limiting the scope of on-line data searches;

transmitting at least one search parameter from said local network site to said at least one on-line search engine at said network site remote from said local network site to initiate a search by said on-line search engine throughout said distributed computer network for data related to said at least one search parameter; and automatically linking said independent user-defined plug-in program with said at least one search parameter such that a result of said search initiated throughout said distributed computer network will be filtered utilizing both said at least one search parameter and said independent user-defined plug-in program.

2. The method for enhanced on-line search processing in a distributed computer network according to claim 1, wherein said step of designating an independent user-defined plug-in program to be stored at said local network site for limiting the scope of on-line data searches further comprises the step of designating an independent user-defined plug-in program to be stored at said local network site for limiting the scope of time duration of on-line data searches.

3. The method for enhanced on-line search processing in a distributed computer network according to claim 1, wherein said step of designating an independent user-defined plug-in program to be stored at said local network site for limiting the scope of on-line data searches further comprises the step of designating an independent user-defined plug-in program to be stored at said local network site which includes a directory file such that said at least one on-line search engine may access said directory file.

4. A system for enhanced on-line search processing in a distributed computer network which includes at least one on-line search engine at a network cite remote from a local network site, said system comprising:

means for designating an independent user-defined plug-in program to be stored at said local network site for limiting the scope of on-line data searches;

means for transmitting at least one search parameter from said local network site to said at least one on-line search engine at said network site remote from said local network site to initiate a search by said on-line search engine throughout said distributed computer network for data related to said at least one search parameter; and means for automatically linking said independent user-defined plug-in program with said at least one search parameter such that a result of said search initiated throughout said distributed computer network will be filtered utilizing both said at least one search parameter and said independent user-defined plug-in program.

5. The system for enhanced on-line search processing in a distributed computer network according to claim 4, wherein said means for designating an independent user-defined plug-in program to be stored at said local network site for limiting the scope of on-line data searches further comprises the means for designating an independent user-defined plug-in program to be stored at said local network site for limiting the scope of time duration of on-line data searches.

6. The system for enhanced on-line search processing in a distributed computer network according to claim 4, wherein said means for designating an independent user-defined plug-in program to be stored at said local network site for limiting the scope of on-line data searches further comprises the means for designating an independent user-defined plug-in program to be stored at said local network site which includes a directory file such that said at least one on-line search engine may access said directory file.

7. A program product residing in a computer for permitting enhanced on-line search processing in a distributed computer network which includes at least one on-line search engine at a network site remote from a local network site, said program product comprising:

instruction means residing in a computer for designating an independent user-defined plug-in program to be stored at said local network site for limiting the scope of on-line data searches;

instruction means residing in a computer for transmitting at least one search parameter from said local network site to said at least one on-line search engine at said network site remote from said local network site to initiate a search by said on-line search engine throughout said distributed computer network for data related to said at least one search parameter; and instruction means residing in a computer for automatically linking said independent user-defined plug-in program with said at least one search parameter such that a result of said search initiated throughout said distributed computer network will be filtered utilizing both said at least one search parameter and said independent user-defined plug-in program.

8. A program product residing in a computer for enhanced on-line search processing in a distributed computer network according to claim 7, wherein said instruction means residing in a computer for designating an independent user-defined plug-in program to be stored at said local network site for limiting the scope of on-line data searches further comprises instruction means residing in a computer for designating an independent user-defined plug-in program to be stored at said local network site for limiting the scope of time duration of on-line data searches.

9. The program product for enhanced on-line search processing in a distributed computer network according to claim 7, wherein said instruction means residing in a computer for designating an independent user-defined plug-in program to be stored at said local network site for limiting the scope of on-line data searches further comprises the instruction means residing in a computer for designating an independent user-defined plug-in program to be stored at said local network site which includes a directory file such that said at least one on-line search engine may access said directory file.

10. The program product residing in a computer for enhanced on-line search processing in a distributed computer network according to claim 7, wherein each of said instruction means further comprises signal bearing media.

11. The program product residing in a computer for enhanced on-line search processing in a distributed computer network according to claim 10, wherein said signal bearing media further comprises transmission media.

12. The program product residing in a computer for enhanced on-line search processing in a distributed computer network according to claim 10, wherein said signal bearing media further comprises recordable media.

\* \* \* \* \*